United States Patent [19]

Bolz et al.

[11] Patent Number: 5,108,233
[45] Date of Patent: Apr. 28, 1992

[54] HYDRAULIC CONTAINER CONVEYING APPARATUS

[76] Inventors: Alfred Bolz, Uhlangweg 25, D-7988 Wangen im Allgaäu; Günther Boos, Kapellenweg 6, D-7778 Markdorf, both of Fed. Rep. of Germany

[21] Appl. No.: 554,012

[22] Filed: Jul. 16, 1990

[30] Foreign Application Priority Data

Jul. 20, 1989 [EP] European Pat. Off. ........... 89113304

[51] Int. Cl.⁵ .................... B65G 51/04; B65G 51/36
[52] U.S. Cl. .................... 406/184; 406/187; 406/189; 406/186
[58] Field of Search ............ 406/184, 186, 190, 37, 406/187, 5, 9, 189; 99/360, 361; 422/25; 426/416, 520, 521

[56] References Cited

U.S. PATENT DOCUMENTS

| | | | |
|---|---|---|---|
| 1,488,761 | 4/1924 | MacMillan | 406/184 |
| 1,965,933 | 7/1934 | Taisey | 406/184 X |
| 3,511,168 | 5/1970 | Pech | 99/360 |
| 4,000,927 | 1/1977 | Sakamoto | 302/2 R |
| 4,557,638 | 12/1985 | O'Neill | 406/186 |

FOREIGN PATENT DOCUMENTS

| | | |
|---|---|---|
| 0139780 | 10/1983 | European Pat. Off. . |
| 2149122 | 4/1973 | Fed. Rep. of Germany . |
| 3307902 | 9/1984 | Fed. Rep. of Germany . |
| 3508134 | 9/1986 | Fed. Rep. of Germany . |
| 205513 | 6/1939 | Switzerland ............ 99/361 |
| 1289765 | 2/1987 | U.S.S.R. ............... 406/184 |

Primary Examiner—Margaret A. Focarino
Assistant Examiner—James M. Kannofsky
Attorney, Agent, or Firm—Peter K. Kontler

[57] ABSTRACT

A conduit having a circular or polygonal cross-sectional outline serves for reception of one or more receptacles which are conveyed therein by a hydraulic fluid. Each receptacle can be taken apart or is formed with one or more compartments for one or more sealed containers confining foodstuffs or other substances which are to be heated or cooled by the hydraulic fluid. The front and/or rear end walls of the receptacles are provided with distancing elements which ensure that the distance between two neighboring receptacles in the conduit cannot be reduced below a predetermined minimum value. The distancing elements of neighboring receptacles can form universal joints which maintain such receptacles at a predetermined minimum and maximum distance from each other. The openings of one-piece receptacles are immediately or closely adjacent the internal surface of the conduit, and the openings of sections of composite receptacles are accessible only when the respective receptacles are located outside of the conduit. The receptacles enable the hydraulic fluid to directly contact the containers in the respective receptacles. If the containers are brittle, the receptacles confine larger fragments of broken containers, e.g., of glass jars which break as a result of abrupt heating or cooling in the conduit.

19 Claims, 5 Drawing Sheets

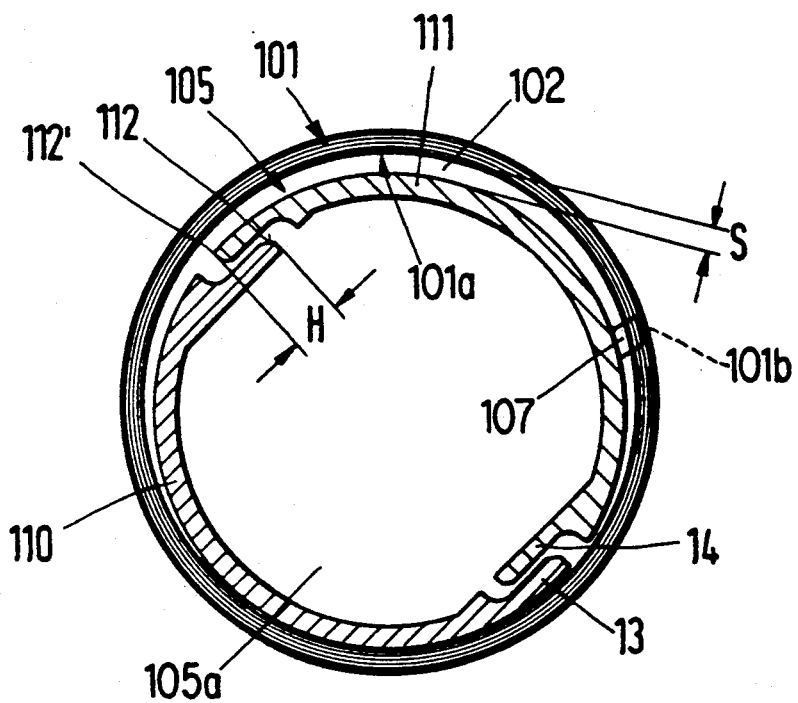
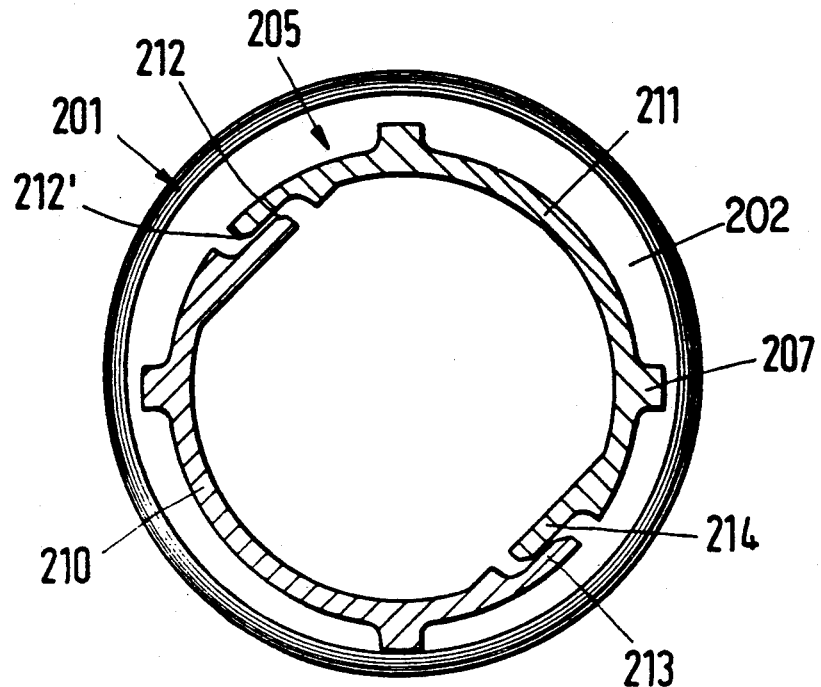

HYDRAULIC CONTAINER CONVEYING APPARATUS

BACKGROUND OF THE INVENTION

The invention relates to improvements in apparatus for transporting or conveying containers in conduits in a stream of water or another hydraulic fluid. More particularly, the invention relates to improvements in apparatus which can use a hydraulic fluid as a means for propelling containers through one or more conduits as well as a means for influencing the characteristics of the contents of containers.

Commonly owned European Pat. No. 0 139 780 discloses an apparatus wherein containers which contain foodstuffs and/or other commodities are sealed and admitted into a conduit to be conveyed by a stream of hydraulic fluid. The fluid can serve to heat the containers and their contents to a predetermined temperature which is necessary to sterilize the confined foodstuffs. The containers can constitute glass jars, cans or sealed envelopes consisting of metallic or plastic foil. As a rule, the configuration of the cross-sectional outline of the conduit will depend upon the selected shape of the containers which are to be conveyed therein.

A drawback of apparatus wherein the containers are admitted directly into the stream of hydraulic fluid in a conduit (e.g., in a pipeline of considerable length) is that the shreds of a single broken container which is made of glass or another brittle material are likely to clog the conduit and necessitate prolonged stoppages of the apparatus. A glass jar is likely to break because its material is defective or because it is subjected to excessive thermal shocks during rapid heating or cooling by the hydraulic fluid. Another drawback of the patented apparatus is that it is not sufficiently versatile, mainly because it can accept and convey only containers of a particular size and shape.

U.S. Pat. No. 3,511,168 to Pech discloses an apparatus for processing products (particularly baby foods) in containers (such as glass jars) which are confined in cartridges or cassettes. The cassettes are advanced by mechanical means along predetermined paths through a series of boilers. Each cassette is assembled of two parts one of which is slipped over the rear portion and the other of which is slipped over the front portion of a container. It is necessary to establish a pronounced frictional engagement between the two parts which surround a container; this ensures that a cassette does not open during advancement along its path through the boilers. The establishment of frictional engagement between the parts of each assembled cassette, and termination of such engagement for the purpose of removing a treated container, necessitates the exertion of a certain force and contributes to the length of intervals which are needed for manipulation of cassettes for the purposes of inserting and again for the purposes of removing containers therefrom. The parts of cassettes are made (at least partially) of a magnetic material to facilitate rapid automatic assembly around discrete containers in the form of glass jars or the like. Mechanical connections between the parts of the cassettes are not sufficiently reliable to permit introduction of assembled cassettes into a stream of hydraulic fluid. Opening of a cassette within a hydraulic conduit would enable a glass jar to escape into the conduit, and breakage of a single glass jar could entail prolonged clogging of the conduit and prolonged interruptions of operation of the entire apparatus as well as of all apparatus which deliver jars to or receive jars from the patented apparatus.

Published German patent application No. 2 149 122 of Wieser et al. discloses a sterilizing apparatus wherein containers for foodstuffs are confined in receptacles in the form of cassettes. The cassettes are transported in pipelines by streams of hydraulic fluid. The arrangement is such that a cassette which has been inserted into the pipeline remains closed to prevent accidental exposure and escape of the confined container. The patented apparatus permits the cassettes in the pipeline to gather into long trains of immediately adjacent cassettes. This prevents predictable and reliable advancement of cassettes and of their contents through various treating zones.

U.S. Pat. No. 4,000,927 to Sakamoto et al. discloses a capsule hydraulic transportation system wherein the capsules can be opened in a pipeline. The purpose of capsules is to transport batches of granular, pulverulent and like substances which are not confined in containers. The reference discloses that the capsules can carry projections which enable a counter to count the number of capsules advancing between two windows in the pipeline.

U.S. Pat. No. 4,557,638 to O'Neill discloses a pneumatic tube conveyor of the type used for transport of messages and the like. The patented apparatus is not designed to advance containers in the form of cartridges or cassettes in a stream of hydraulic fluid.

Published German patent application No. 33 07 902 of Bojak discloses a hydraulic or pneumatic system for the conveying of fragmentized materials such as coal or other minerals. The materials to be conveyed are compacted into balls, cylinders or like bodies (e.g., by resorting to an adhesive) which are thereupon introduced into the stream of a gaseous or hydraulic fluid for transport in a pipeline. The reference further discloses protuberances (shown in FIG. 4) which are provided for the purpose of preventing excessive wear upon the bodies of compressed or compacted granular or other fragmentized material. The bodies of compacted material are pushed through the pipeline.

Published German patent application No. 35 08 134 of Bolz discloses an insert which can be installed in a conduit to guide bodies which are conveyed by a hydraulic fluid. The guide or insert is actually an element of the pipeline.

OBJECTS OF THE INVENTION

An object of the invention is to provide an apparatus which can serve for predictable transport of sealed containers in a pipeline with a stream of water or another hydraulic fluid.

Another object of the invention is to provide the apparatus with novel and improved means for maintaining a series of receptacles for sealed containers at an optimum distance from each other.

A further object of the invention is to provide an apparatus wherein the receptacles (e.g., cassettes, capsules or like hollow bodies) cannot discharge their contents as long as they remain in a conduit for the stream of hydraulic fluid.

An additional object of the invention is to provide an apparatus wherein the pipeline requires less frequent cleaning than in heretofore known apparatus.

Still another object of the invention is to provide an apparatus of the above outlined character with novel and improved receptacles for discrete sealed containers or for groups of two or more sealed containers.

A further object of the invention is to provide the apparatus with novel and improved means for preventing the gathering of successive receptacles into a train or chain of immediately adjacent receptacles such as would interfere with proper advancement of receptacles in a stream of hydraulic fluid and/or with proper treatment of the contents of containers in the receptacles.

Another object of the invention is to provide the apparatus with novel and improved means for preventing or limiting changes of orientation of containers and/or receptacles in a conduit.

A further object of the invention is to provide the apparatus with novel and improved means for facilitating predictable detection of orientation of successive receptacles in one or more portions of their path within one or more conduits for a stream of hydraulic fluid.

An additional object of the invention is to provide the apparatus with novel and improved means for preventing opening of receptacles within a conduit for hydraulic fluid.

Another object of the invention is to provide an apparatus which can transport brittle containers without risking clogging of the conduit with fragments of broken containers.

An additional object of the invention is to provide an apparatus wherein one and the same conduit can confine and guide different types of receptacles for sealed containers.

SUMMARY OF THE INVENTION

The invention is embodied in an apparatus for transporting sealed containers, e.g., glass jars or containers consisting of metallic or plastic foil. The improved apparatus comprises at least one elongated hydraulic conduit, and a plurality of container-confining liquid-permeable receptacles each of which is receivable in and is movable within the at least one conduit in at least one predetermined orientation. Each receptacle has at least one external distancing element which serves to abut a neighboring receptacles in the at least one conduit. This facilitates predictable transport of receptacles in the at least one conduit by a stream of hydraulic fluid, particularly a hydraulic fluid which serves to treat (e.g., heat or cool) the contents of the container or containers in the receptacle or receptacles within the at least one conduit.

Each receptacle is provided with at least one opening for admission of containers into and for evacuation of containers from the respective receptacle. The at least one opening of each receptacle in the at least one conduit preferably faces the internal surface of the at least one conduit, i.e., the at least one opening does not face forwardly or rearwardly as seen in the direction of advancement of receptacles in the at least one conduit under the action of water or another hydraulic fluid. The at least one conduit defines for the receptacles a path having a predetermined cross-sectional outline, and each receptacle is receivable in and is movable along the path with a certain amount of lateral play relative to the at least one conduit, i.e., with a certain amount of play in a direction transversely of the longitudinal direction of the elongated conduit.

Each receptacle can be provided with at least one container-receiving compartment which extends substantially transversely of the longitudinal direction of the at least one elongated conduit when the respective receptacle is received in the at least one conduit. The at least one compartment of a receptacle in the at least one conduit can be provided with two open ends each of which faces the internal surface of the conduit. The at least one compartment of each receptacle can constitute a straight tunnel with two spaced-apart open ends.

Each receptacle can be assembled of a plurality of sections which are separable from each other in order to afford access to one or more containers therein when the respective receptacle is located outside of the at least one conduit. At least one of the receptacles can consist of two identical separable sections. The arrangement is preferably such that separation of the two sections involves a movement of such sections through a predetermined distance, and the at least one receptacle which consists of two sections is receivable in the at least one conduit with a certain amount of lateral play which is less than the predetermined distance, i.e., the two sections can be separated form each other only after the respective receptacle has been withdrawn from the at least one conduit.

At least one of the receptacles can be provided with at least one external follower which is adjacent the internal surface of the at least one conduit when the respective receptacle is inserted into such conduit in the at least one predetermined orientation. The at least one conduit can be provided with at least one substantially longitudinally extending internal groove for the follower or followers of one or more receptacles in the at least one conduit. This ensures that the receptacles can advance in the at least one conduit only in an orientation in which the followers of the receptacles extend into the internal groove.

Each receptacle can include at least one signal generating portion, e.g., a magnet, which can cause a detector adjacent or in or on the at least one conduit to generate a signal when the respective receptacles reach a predetermined portion of their path or leave the at least one conduit.

If at least one receptacle comprises or consists of separable sections, such sections can be provided with bevelled or chamfered overlapping portions to facilitate rapid assembly of sections into a receptacle which is ready to be introduced into the at least one conduit.

Each receptacle can be provided with a distancing element at its front end and with a distancing element at its rear end. This ensures that each receptacle can be introduced into the at least one conduit in at least two predetermined orientations, namely with the front end leading or with the rear end leading. The axes of the distancing elements preferably coincide with or are closely adjacent the central longitudinal axes of the respective receptacles; this ensures that the distancing element of a first receptacle in the at least one conduit abuts the distancing element of an adjoining receptacle or that the distancing element of each inserted receptacle abuts a predetermined portion of the adjacent end wall of the adjoining receptacle. Each distancing element, or at least some of the distancing elements, can include a spherical portion which is movable into abutment with an adjoining receptacle, e.g., into abutment with the spherical portion of the distancing element on an adjoining receptacle in the at least one conduit.

The arrangement may be such that a first receptacle has a male distancing element and a second receptacle has a complementary female distancing element which is movably coupled to the male distancing element; for example, the male and female distancing elements can form a universal joint wherein the spherical head of one distancing element extends into a complementary concave socket of the other distancing element. Each receptacle can be provided with a male distancing element at one of its ends and with a female distancing element at the other end; this renders it possible to couple any desired number of receptacles to each other to form an elongated train which is advanced through the at least one conduit by a stream of water or another hydraulic fluid.

The distancing elements are or can be arranged to maintain neighboring receptacles in the at least one conduit at a distance which is between approximately 20 and 25 percent of the length of a receptacle.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 2 is a similar end elevational view of a cylindrical conduit and a transverse vertical sectional view of a two-piece cylindrical receptacle in the conduit;

FIG. 3 is a similar end elevational view of a cylindrical conduit and a transverse sectional view of a two-piece receptacle constituting a modification of the receptacle which is shown in FIG. 2;

DESCRIPTION OF PREFERRED EMBODIMENTS

Figure 1:
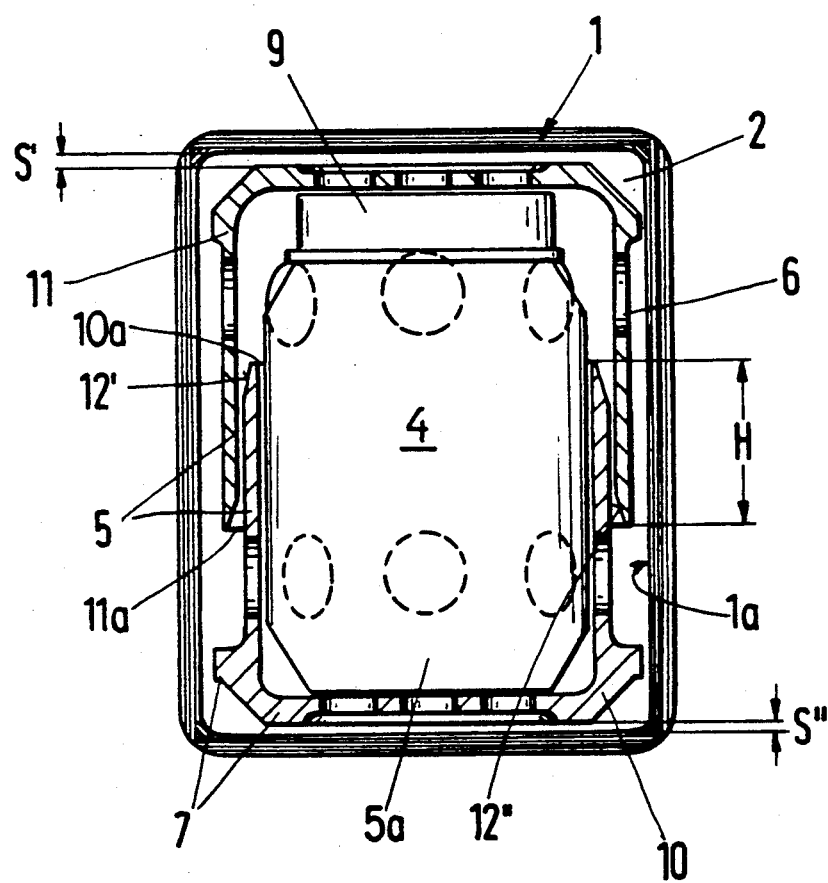
FIG. 1 is an end elevational view of a polygonal conduit and a transverse sectional view of a two-piece receptacle for containers in the form of glass jars, the receptacle being shown in closed position and being inserted into the conduit for movement in a direction at right angles to the plane of FIG. 1.

FIG. 1 shows a portion of an apparatus which embodies one form of the present invention. The apparatus comprises one or more elongated conduits 1 each of which has a non-circular cross-sectional outline (the conduit 1 of FIG. 1 has a rectangular cross-sectional outline). The internal space 2 of the conduit 1 of FIG. 1 serves to receive a series of discrete two-piece receptacles 5 (one shown) which have annuli of holes or openings 6 and are caused to advance longitudinally of the conduit (e.g., in a direction at right angles to the plane and away from the observer of FIG. 1) by a stream of hydraulic liquid (e.g., water). The manner of admitting a stream of water into and of evacuating water from the conduit 1 forms no part of the present invention. Reference may be had to the aforediscussed U.S. Pat. No. 4,000,927 the disclosure of which is incorporated herein by reference.

Each receptacle 5 serves to receive one or more hermetically sealed containers 4, e.g., glass jars with screw-on caps 9 or other suitable closures. The illustrated jar 4 is confined in the receptacle 5 of FIG. 1 with a relatively small amount of lateral play (i.e., transversely of the longitudinal direction of the conduit 1) as well as with a relatively small amount of play in the longitudinal direction of the conduit. This reduces the likelihood of breakage of the jar or jars 4 in the receptacle 5 during transport of the receptacle along the elongated path which is defined by the internal surface 1a of the conduit 1. The purpose of holes 6 in the receptacle 5 is to admit the conveying liquid so that such liquid can condition the contents (e.g., baby food) in the interior of the hermetically sealed jar or jars 4. The liquid which serves to convey the receptacle or receptacles 5 along the path which is defined by the conduit 1 is pumped into the conduit at a requisite pressure and is maintained at a selected temperature or within a preselected temperature range in order to ensure predictable treatment of the contents of one or more jars 4 during transport from a receptacle-admitting station to a receptacle-discharging or evacuating station, not shown.

The illustrated glass jar 4 can be replaced with a sealed container which is made of tinplate, aluminum sheet stock, metallic foil or plastic foil of the type often used for confinement of various foodstuffs. The treatment to which the jar or jars 4 are subjected in the conduit 1 can include a heating stage or phase, a second stage or phase which involves maintaining the contents of the jar or jars at a predetermined temperature for a preselected interval of time, and a cooling phase or stage which precedes expulsion or evacuation of the respective receptacle or receptacles 5 from the conduit. The treatment can result in sterilization (e.g., pasteurization) of foodstuffs in the jar or jars 4, i.e., in longer useful life of the thus treated substances.

It is preferred to maintain the hydraulic liquid in the internal space 2 of the conduit 1 at a certain pressure which suffices to prevent bursting of the jars 4 as a result of heating. The treatment at a pressure exceeding atmospheric pressure can involve heating of the jar or jars to a temperature of 90°–135° C. Initial heating and retention of a predetermined temperature involves the conveying in a stream of hot water or another hydraulic liquid, and the last phase or stage of treatment involves admission into the conduit 1 of a stream of cold or cooler hydraulic liquid in order to effect gradual or abrupt reduction of temperature of the sealed contents of one or more jars 4 to a desired value prior to expulsion of the respective receptacle 5 from the conduit 1.

The receptacle 5 can be designed to accommodate a substantial number of sealed containers, e.g., one or more stacks of superimposed cans made of metallic or plastic sheet material or metallic or plastic foil. Containers 4 in the form of glass jars are often preferred for confinement and treatment of baby foods and certain other foodstuffs which should not contact a metallic or plastic substance. The screw cap 9 can be replaced with a snap-on cap, with a cap which can be attached to the vitreous material of the jar 4 by a bayonet mount or by any other suitable closure for the material-admitting and evacuating opening of the jar.

The dimensions of one or more containers which are confined in a receptacle 5 are preferably selected in such a way that the receptacle is substantially filled. The holes 6 are preferably small or relatively small so that, if the confined container or containers are made of glass or another brittle material, the holes 6 are not likely to permit penetration of large fragments of broken glass or ceramic material into the stream of hydraulic liquid in the conduit 1, i.e., into the internal space 2 around the respective receptacle 5. Breakage of defective ceramic jars, glass jars or like containers can occur in response to thermal shocks, i.e., in response to rapid or abrupt heating or cooling of the containers by hydraulic liquid which enters the receptacle. Thus, the receptacle 5 not only serves as a means for advancing one or more confined containers but also as a means for intercepting at least the larger fragments or shreds of one or more destroyed containers. This ensures that the conduit 1 need not be evacuated and cleaned at frequent intervals, i.e., this contributes to a higher output of the apparatus which employs the structure of FIG. 1.

The receptacle 5 of FIG. 1 is assembled of two cup-shaped or trough-shaped sections 10, 11 one of which is inserted into the other by a distance H. Each of the sections 10, 11 has an opening 10a, 11a which faces the internal surface 1a of the conduit 1 when the receptacle 5 is properly assembled and is inserted into the conduit in one of several (e.g., three) predetermined orientations, e.g., in the orientation which is shown in FIG. 1, in an orientation in which the section 10 is located above the section 11, and in an orientation in which the front end wall 5a of the receptacle 5 constitutes the rear end wall and the rear end wall (not shown in FIG. 1) constitutes the front end wall.

The receptacle 5 is received in the conduit 1 with a certain amount of lateral play (S'+S'') between the top and bottom walls of the conduit, and with a certain amount of lateral play in directions to the left and to the right, as seen in FIG. 1. The total lateral play S'+S'' is less (e.g., considerably less) than the distance H (the extent of penetration of the section 10 into the section 11) so that the receptacle 5 cannot be opened within the conduit 1 and that the receptacle must be properly assembled prior to insertion into the conduit. This ensures that the container or containers (such as one or more jars 4) remain confined in the respective receptacle or receptacles 5 while the receptacles are located in the path which is bounded by the internal surface 1a of the conduit 1. The arrangement may be such that an empty receptacle 5 is opened externally of the conduit 1 by slipping the section 11 off the section 10. The person in charge or a machine then admits one or more jars 4 into the section 10 by way of the opening 10a, the section 11 is then slipped onto the section 10, and the thus assembled receptacle 5 is ready for introduction into the conduit 1.

It is not necessary to lock the sections 10, 11 to each other, e.g., by separable complementary male and female detent means, by one or more straps, by threads or in any other suitable way. The reason is that the afore-discussed relationship of the play S'+S'' to the distance D automatically ensures that a receptacle 5 which has been inserted into the conduit 1 cannot be opened except subsequent to evacuation or expulsion from the conduit upon completion of the sterilizing or any other selected treatment of the contents of the jar or jars 4. In order to facilitate assembly of the receptacle 5, the edges of the sections 10, 11 are bevelled around the respective openings 10a, 11a (as at 12' and 12'').

The distribution and/or the overall number of holes 6 in the sections 10, 11 of the illustrated receptacle 5 can depart from that which is shown in FIG. 1. All that counts is to ensure that these holes permit penetration of adequate quantities of hydraulic fluid into the receptacle 5 in the internal space 2 of the conduit 1. It is often desirable to distribute the holes 6 in such a way that at least some of these holes establish paths for rapid outflow of hydraulic fluid from the receptacle 5 before or after the latter reaches the expelling or evacuating station.

The receptacle 5 of FIG. 1 is further provided with several followers 7 (one at each of its corners) which are rather closely adjacent the internal surface 1a and determine the extent of lateral play with which a properly assembled receptacle is received in the conduit 1. Such followers can form integral parts of the respective sections (10, 11) of the receptacle 5. The number of followers 7 can be reduced to less than or increased to more than four without departing from the spirit of the invention.

Evacuation of receptacles 5 from the conduit 1 (with the properly treated jar or jars 4 therein) can be carried out by hand or by resorting to a suitable evacuating mechanism of any known design.

Figure 4:
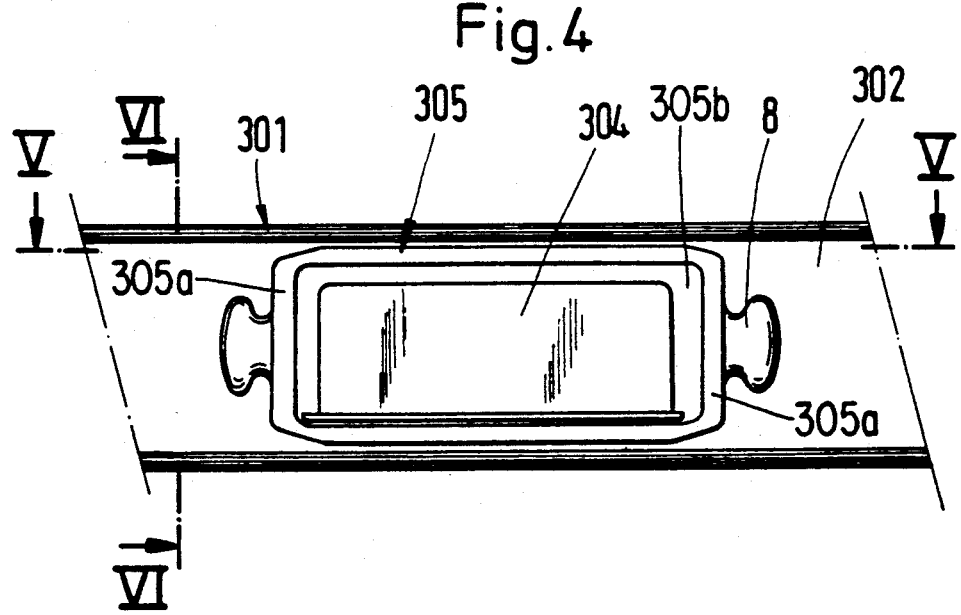
FIG. 4 is a schematic longitudinal sectional view of a polygonal conduit and an elevational view of an elongated one-piece receptacle having a transversely extending compartment for one or more containers and a distancing element at each of its ends.
Figure 5:
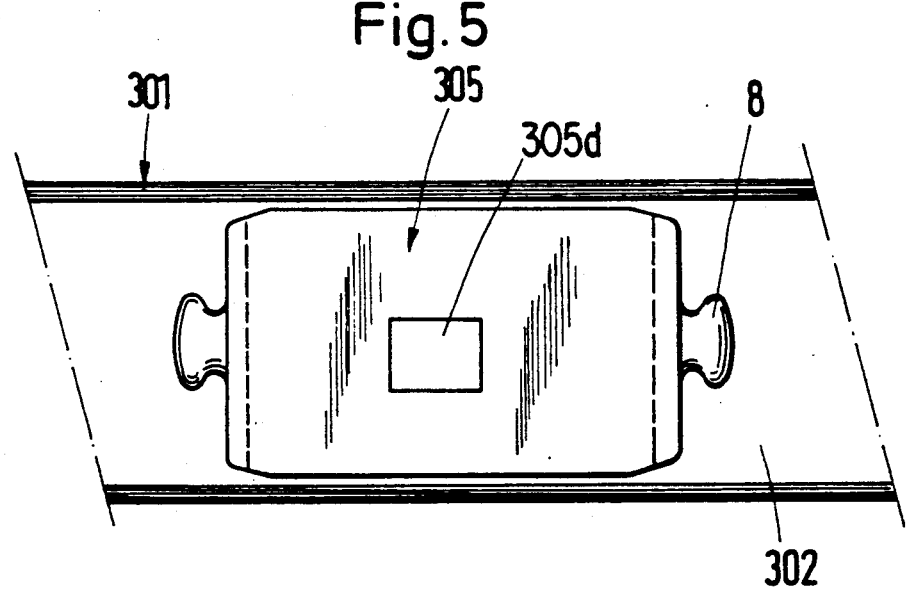
FIG. 5 is an enlarged sectional view substantially as seen in the direction of arrows from the line V—V of FIG. 4.
Figure 6:
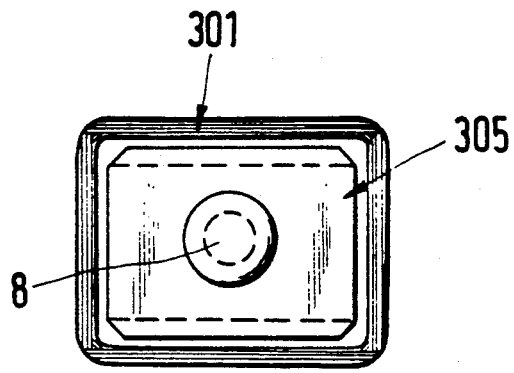
FIG. 6 is a sectional view substantially as seen in the direction of arrows from the line VI—VI of FIG. 4.
Figure 9:
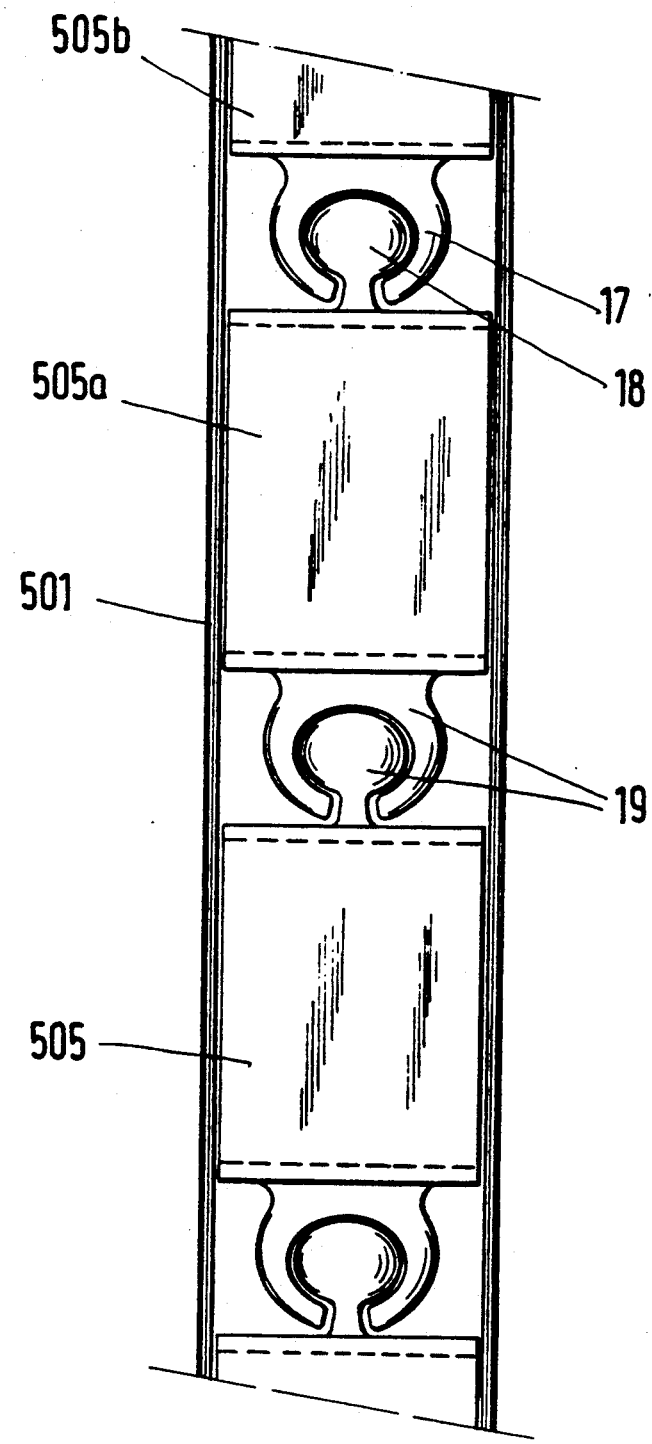
FIG. 9 is a schematic longitudinal sectional view of a conduit and an elevational view of several neighboring receptacles which are coupled to each other by universal joints consisting of complementary male and female distancing elements.

At least one end wall of each receptacle 5 is provided with at least one distancing element (not shown in FIG. 1), e.g., a distancing element of the type shown in FIGS. 4–6 or in FIG. 9.

The receptacle 5 can be constructed and assembled in such a way that its two sections 10, 11 can move relative to each other in directions other than those which are required to introduce the section 10 into or to withdraw the section 10 from the section 11. For example, the sections 10, 11 can be designed for movement relative to each other in a direction at right angles to the plane of FIG. 1 subsequent to partial extraction of the section 10 from the section 11.

The followers 7 not only serve to reduce the extent of lateral play of the receptacle 5 in the conduit 1 but also as a means for reducing friction between the sections 10, 11 on the one hand and the conduit on the other hand when the receptacle 5 is in the process of moving in the internal space 2 of the conduit. Such reduction of friction renders it possible to operate with a hydraulic fluid which need not be maintained at an elevated pressure.

The bevelled edges 12', 12'' are optional, especially if the section 10 is receivable in the section 11 with a reasonably large amount of play. These bevelled edges facilitate rapid insertion (i.e., "threading") of the open side of the section 10 into the section 11. Moreover, the bevelled edges render it possible to rapidly introduce the section 10 into the section 11 even if the lateral play between the sections of the assembled receptacle 5 is minimal or nearly zero.

FIG. 2 shows a portion of a second apparatus which employs one or more cylindrical conduits 101. The illustrated receptacle 105 is assembled of two identical mirror symmetrical semicylindrical sections 110, 111 each having two axially parallel marginal portions 13, 14 with bevelled edges, as at 112, 112', to facilitate assembly subsequent to introduction of one or more containers into the section 110 or 111. The maximum or total lateral play S of the assembled receptacle 105 in the conduit 101 is less than the extent of overlap (distance H) between the marginal portions 13, 14 of the two sections; this ensures that the receptacle 105 cannot be opened subsequent to admission into the conduit 101.

As a rule, the follower or followers (shown at 7 in FIG. 1) are not needed in the apparatus of FIG. 2 because the outline of the external surface of the assembled receptacle 105 is complementary to that of the internal surface 101a of the conduit 101. However, if it is desired to ensure that the receptacle 105 cannot turn in the internal space of the conduit 101, at least one of the sections 101, 111 can be provided with one or more external followers 107 which extend into complementary grooves 101b in the internal surface of the conduit. The follower 107 and the groove 101b which are shown in FIG. 2 constitute an optional feature of the apparatus.

The section 110 and/or 111 is or can be formed with one or more holes (corresponding to the holes 6 of FIG. 1) in order to a permit hydraulic fluid (e.g., water) to penetrate from the internal space 102 of the conduit 101 into the internal space of the properly assembled receptacle 105. Such holes will be provided if the clearance between the neighboring marginal portions 13, 14 does not suffice to permit circulation of adequate quantities of hydraulic fluid between the internal space 102 of the conduit 101 and the interior of the receptacle 105.

The end walls (one shown at 105b) can be provided on the section 110, and the end portions of the section 111 then fit between such end walls when the sections 110, 111 are properly assembled around one or more confined containers, not shown. Excessive (or any) axial movements of the sections 110, 111 relative to each other can be prevented by providing at least one of the marginal portions 13, 14 with one or more teeth (not shown) extending into one or more complementary tooth spaces in the other marginal portion 14 or 13.

The end walls 105a of the receptacle 105 are also provided with external distancing elements, e.g., with distancing elements of the type shown in FIGS. 4-6 or in FIG. 9.

It is often immaterial if the angular position of the receptacle 105 changes in the conduit 101 since the two sections 110, 111 of this receptacle cannot become separated from each other as long as the receptacle remains in the conduit. However, if it is important (e.g., at the intake end and/or at the discharge end of the conduit 101) that the receptacle 105 enter or leave the conduit in a predetermined orientation, it is merely necessary to provide the section 110 and/or 111 with one or more external followers 107 which extend into one or more complementary internal grooves 101b of the conduit 101. Each groove 101b can have an inlet which flares outwardly counter to the direction of advancement of the receptacle 105 in order to ensure that each external follower 107 of the section 110 and/or 111 automatically finds its way into the narrower portion of the groove as the receptacle continues to advance in the conduit 101. This ensures that the receptacle in a conduit having one or more grooves at its discharge end invariably leaves the conduit in a predetermined orientation or in one of several predetermined orientations.

The external follower or followers of a receptacle can serve an additional useful purpose. Thus, it is possible to grasp such followers by suitable grippers (not shown) at the intake end of a conduit in order to facilitate automatic introduction of receptacles into the conduit and/or by suitable grippers at the discharge end of the conduit to permit automatic transfer of freshly expelled receptacles to a station where the receptacles are drained or opened to permit automatic or manual removal of their contents.

FIG. 3 illustrates a portion of a third apparatus which constitutes a modification of the apparatus of FIG. 2. All such parts of this apparatus which are identical with or clearly analogous to corresponding parts of the apparatus of FIG. 2 are denoted by similar reference characters plus 100. The main difference between these apparatus is that the outer diameter of the assembled receptacle 205 is considerably smaller than the inner diameter of the cylindrical conduit 201. In order to prevent accidental opening of the two-piece receptacle 205 in the internal space 202 of the conduit 201, the sections 210, 211 are provided with pronounced external followers 207 which limit the lateral play of the assembled receptacle 205 in the conduit 201 to less than the extent of overlap between the two pairs of marginal portions 213, 214. Each of the sections 210, 211 is provided with two followers 207 (e.g., in the form of ribs which extend in the axial direction of the conduit 201). However, it is equally within the purview of the invention to reduce or increase the overall number of followers 207 and/or to change the configuration and/or distribution of such followers; all that counts is to ensure that the followers prevent opening of the receptacle 205 in the internal space 202 of the conduit 201.

The section 210 is identical with the section 211, the same as described with reference to the sections 110, 111 of FIG. 2. This is desirable and advantageous because any two sections of the type shown in FIG. 2 or 3 can be assembled to jointly form a receptacle 105 or 205. Moreover, it is not necessary to maintain large supplies of sections for assembly of the receptacles 105 or 205.

The conduit 1, 101 or 201 can be made of a metallic, plastic or other suitable material, as long as it can stand the pressures and temperatures which are necessary to ensure adequate treatment of the contents of sealed containers in the receptacles 5, 105 or 205.

An important advantage of the two-piece receptacles which are shown in FIGS. 1 to 3 is that their sections need not be frictionally and/or otherwise connected to each other in order to prevent escape of confined containers (such as jars of the type shown at 4 in FIG. 1). The reason is that the openings of both sections of each of these receptacles face the internal surfaces of the respective conduits and that the combined lateral play of receptacles in their conduits is less than the extent to which the sections of these receptacles overlap. Absence of frictional or any other pronounced engagement between the sections of a properly assembled two-piece receptacle renders it possible to rapidly open the receptacle for the purpose of permitting introduction or removal of one or more containers, or to rapidly close the receptacle preparatory to insertion into the respective conduit. The sections of each of the receptacles 5, 105, 205 cannot be taken apart while in the respective conduit because a movement of such sections in a direction to become separated from one another must take place transversely of the longitudinal direction of the conduit.

The cross-sectional outlines of receptacles will be selected in dependency upon the cross-sectional outlines of available conduits or vice versa. The conduit or conduits can have an oval, square or other polygonal outline. An advantage of non-cylindrical conduits is that the receptacles can be readily held against changes in angular position during advancement in the respective conduits. On the other hand, conduits in the form of cylindrical pipes or tubes are often more readily available and less expensive than conduits having an oval or polygonal cross-sectional outline. The cylindrical conduit 101 or 201 can also serve for reception and confinement, as well as guidance, of receptacles having an oval or polygonal outline, e.g., if the internal surface of the conduit 101 or 201 is provided with one or more grooves for suitable followers of the receptacles or if each receptacle has one or more grooves for one or more internal projections of the cylindrical conduit.

FIGS. 4 to 6 illustrate a portion of a fourth apparatus. All such parts of this apparatus which are identical with or clearly analogous to the corresponding parts of the apparatus of FIG. 1 are denoted by similar reference characters plus 300. The conduit 301 has a rectangular cross-sectional outline and the receptacle 305 is a one-piece body having a compartment 305b in the form of a blind hole extending transversely of the longitudinal direction of the conduit 301 and receptacle 305. The compartment 305b is substantially filled by a container 304 which can be inserted into the receptacle 305 by way of the open end of the compartment when the receptacle is located outside of the conduit 301 but which cannot leave the compartment when the receptacle is inserted into and while the receptacle remains in the conduit. The open end of the compartment 305c faces the observer of FIG. 4 and the adjacent portion of the internal surface 302 of the conduit 301 when the receptacle 305 is confined in the conduit.

The end walls 305a of the receptacle 305 carry the aforementioned distancing elements 8 each of which has a rounded (e.g., substantially hemispherical) head abutting the head of one distancing element 8 on a neighboring receptacle 305 (not shown) in the conduit 301. The distancing elements 8 ensure that the minimum distance between two neighboring receptacles 305 in the conduit 301 cannot be reduced below the combined axial length of two distancing elements. The arrangement may be such that the minimum distance between two neighboring receptacles 305 which are so close to each other that their distancing elements 8 abut is between 20 and 25 percent of the length of a receptacle. This has been found to ensure highly satisfactory transport of closely adjacent receptacles 305 by a stream of water or another hydraulic fluid.

The receptacle 305 of FIGS. 4 to 6 can be modified by omitting one of the distancing elements 8 and by increasing the axial length of the remaining distancing element accordingly. However, it is presently preferred to provide each receptacle with two distancing elements 8 because it is then possible to insert either end of the receptacle into the conduit 301, i.e., the distancing element 8 extending beyond the front end wall 305a of the inserted receptacle will invariably abut the distancing element 8 extending from the rear end wall 305a of the previously inserted receptacle if such receptacles are caused or permitted to come sufficiently close to each other so that their distancing elements abut.

The utilization of distancing elements with free end portions having convex external surfaces is desirable and advantageous because this reduces the area of contact between abutting distancing elements and generates less friction, e.g., in arcuate portions of the path which is defined by the conduit 301 (if the conduit is not straight from end to end). A reduction of friction between abutting distancing elements 8 renders it possible to reduce the energy requirements of the pump or pumps which are employed to convey the hydraulic fluid through the conduit 301.

The compartment 305b of the illustrated receptacle 305 can receive two or more smaller containers 304, preferably in such distribution that the body of hydraulic fluid in the compartment can flow around each of the plural containers in order to ensure rapid heating or cooling of the contents of such containers.

The axis of each distancing element 8 preferably coincides with, or is at least substantially parallel to and closely adjacent, the axis of the main portion of the respective receptacle 305. This ensures that the spherical external surface of the front distancing element 8 on a freshly inserted receptacle 305 invariably comes into abutment with the spherical external surface of the trailing distancing element 8 forming part of the immediately preceding receptacle in the conduit 301.

The selection of the positions of distancing elements 8 in such a way that their axes coincide or are closely adjacent the longitudinal central axes of the main portions of the respective receptacles 305 is especially important and desirable if the conduit is a cylinder and the receptacles are rotatable in the cylindrical conduit. This ensures that the distancing elements of two neighboring receptacles invariably abut each other irrespective of the momentary angular positions of such receptacles.

FIG. 5 shows that the receptacle 305 can be provided with a signal generating device 305d in the form of a magnetic plate or the like. This signal generating device serves to initiate the generation of a signal by a suitable detector (not shown) which is adjacent the path of movement of receptacles in the conduit 301. The receptacle 305 can support two or more suitably distributed signal generating devices in the form of magnets or the like, and the apparatus can comprise two or more detectors which generate signals indicating the angular positions of the corresponding signal generating devices at a monitoring station adjacent a preselected portion of the path for the receptacles. Such signals can be processed to furnish information denoting the angular positions of successive receptacles at the monitoring station. If the angular position of a receptacle 305 is unsatisfactory, the monitoring means can be designed to generate signals which are used to alter the orientation of misoriented receptacles prior to expulsion from the conduit 301.

If the receptacles 305 are automatically fed into the conduit 301, the signal generating device or devices 305d can be used to initiate the generation of signals prior to entry of the respective receptacles into the conduit 301, and such signals are used to change the orientation of misoriented receptacles not later than when the receptacles are ready to enter the conduit.

The advantages of distancing elements 8 will be appreciated by bearing in mind that (all other conditions being equal) a single receptacle 305 will advance in the conduit 301 faster than a train of two or more neighboring receptacles, especially a train of two or more neighboring receptacles which are immediately adjacent one another (i.e., if the distancing elements 8 are omitted). The speed at which the receptacles advance in the conduit also depends upon the magnitude of friction between the receptacles and the internal surface of the conduit. Such friction can be reduced by ensuring that the specific weight of a filled receptacle does not appreciably deviate from the specific weight of the hydraulic fluid. Since the receptacles of a series of two or more receptacles are not always filled or charged to the same extent, the specific weight of one receptacle can depart from that of the other receptacle or receptacles. Receptacles having different specific weights advance at different speeds, i.e., the mutual spacing of receptacles in the conduit changes as the receptacles advance in a stream of hydraulic fluid even if the receptacles are admitted into the conduit at identical intervals. In other words, a next-following receptacle can catch up with the immediately preceding receptacle so that the receptacles gather into a train of receptacles which (in the absence of distancing elements) are immediately or very closely adjacent each other. This entails further deceleration of the receptacles with considerable losses in output and excessive heating or cooling of the contents of containers in such receptacles.

The quality of operation of the improved apparatus (not only as concerns the economy of operation but also as concerns the ratio of periods of actual use to periods of standstill per shift or per any other unit of time) depends on several factors including the length of a train of immediately adjacent or closely adjacent receptacles. The length of such train should not exceed a predetermined value. The maximum length of a train of receptacles depends on the overall length of the conduit or conduits which define the path for the receptacles, upon the prescribed maximum output of the apparatus and upon the time which is required for adequate treatment of the charge in each receptacle. Another important factor is the speed at which the receptacles are to be transported in the conduit; for the reasons of economy, the speed of transport should be as low as possible. If the speed of the receptacles is increased, the distances between successive receptacles can be increased. However, this entails higher energy requirements of the means for conveying the hydraulic fluid and, in addition, it is necessary to increase the overall length of the conduit. An apparatus whose operation is economical will transport the receptacles at a minimum acceptable speed and at a minimal mutual spacing of neighboring receptacles for a predetermined period of treatment (i.e., the period of transport and predetermined output).

The distancing elements 8 ensure the establishment of minimum spacing between neighboring receptacles 305, namely a minimum spacing which ensures economical transport of receptacles in the conduit 301.

It is also within the purview of the invention to employ distancing elements on conventional receptacles, namely on receptacles which comprise separable sections and means for locking the assembled sections to each other in order to prevent opening of receptacles in the conduit. However, the provision of such distancing elements is even more advantageous on the improved receptacles 5, 105 or 205 which are designed in such a way that they cannot be opened when inserted into the corresponding conduit because separation of their sections 10, 11 or 110, 111 or 210, 211 necessitates a substantial movement of such sections relative to each other in a direction transversely of the longitudinal direction of the respective conduit, even in the absence of any locking devices for the assembled sections. In other words, the axial length of improved receptacles is fixed in the longitudinal direction of the conduit. Therefore, the provision of distancing elements on such receptacles of fixed length invariably ensures that the mutual spacing of two neighboring receptacles having abutting distancing elements cannot be reduced further, i.e., below a preselected minimum distance.

Figure 7:
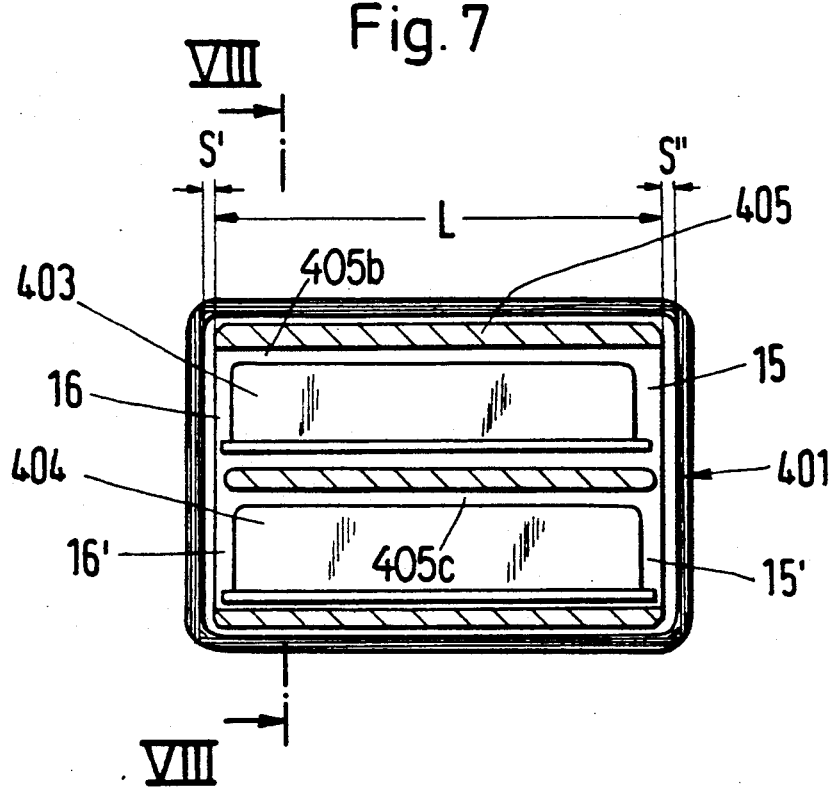
FIG. 7 is a schematic transverse sectional view of a polygonal conduit and of a one-piece receptacle with two transversely extending open-ended compartments for containers.
Figure 8:
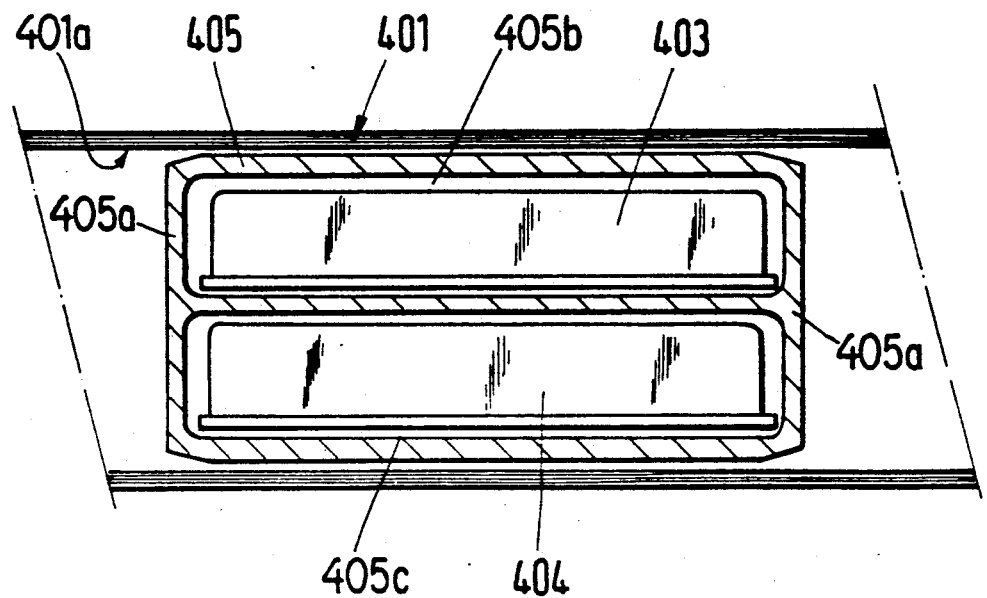
FIG. 8 is a sectional view substantially as seen in the direction of arrows from the line VIII—VIII of FIG. 7.

FIGS. 7 and 8 show a portion of a fifth apparatus which constitutes a modification of the apparatus of FIGS. 4 to 6. All such parts of this apparatus which are clearly analogous to or identical with the corresponding parts of the apparatus of FIGS. 4 to 6 are denoted by similar reference characters plus 100. The conduit 401 has a rectangular cross-sectional outline and serves for reception, confinement and guidance of one or more receptacles 405 each of which has two superimposed compartments 405$b$, 405$c$. The open ends of the upper compartment 405$b$ are shown at 15 and 16, and the open ends of the lower compartment 405$c$ are shown at 15' and 16'. All four open ends are adjacent and face portions of the internal surface 401$a$ of the conduit 401. Each compartment is a straight open-ended tunnel, and each of these compartments can receive a signal container (FIGS. 7 and 8 show a container 403 in the upper compartment or tunnel 405$b$ and a container 404 in the lower compartment or tunnel 405$c$) or two or more containers. Such container or containers cannot leave the respective compartments as long as the receptacle 405 remains in the conduit 401. The maximum lateral play $(S'+S')$ of the receptacle 405 in the conduit 401 is a minute fraction of the length L of the compartment 405$b$ or 405$c$. The provision of compartments which are open at both ends is often desirable and advantageous because this renders it possible to introduce or evacuate containers through either end of the selected compartment, and also because this permits large quantities of hydraulic fluid to rapidly enter that portion of a compartment which is not occupied by one or more containers.

It is clear that the receptacle 405 of FIGS. 7 and 8 can be provided with a single compartment which is open at both ends and extends transversely of the longitudinal direction of the conduit 401. Once a container 403 or 404 (the length of which approximates the length L of the compartment 405$b$ or 405$c$) is properly received in the receptacle 405, such container cannot leave the receptacle after introduction of the receptacle into, and prior to evacuation or expulsion of the receptacle from, the conduit 401.

The combined clearance or play between the top and bottom walls of the receptacle 405 and the top and bottom walls of the conduit 401 can match or can be even less than the combined play $S'+S''$.

The end walls 405$d$ are also provided or can be provided with distancing elements of the type shown in FIGS. 4–6 or with distancing elements of the type to be described in connection with FIG. 9. The front and rear ends of the receptacle 405 can be slightly bevelled to facilitate introduction of such receptacle into the conduit 401.

Receptacles of the type shown in FIGS. 4 to 8 can be used with particular advantage in conduits having a polygonal cross-sectional outline. An advantage of such receptacles is that each thereof can be made of a single piece of metallic, plastic or other suitable material. Thus, it is not necessary to assemble a second section with a first section (as in the embodiments of FIGS. 1 to 3) when one of the section has received one or more containers; this renders it possible to achieve considerable savings in time and to process a large number of receptacles per unit of time. The conduit 301 or 401 can be said to replace one of the sections 10, 11 or 110, 111 or 201, 211 in that it closes the open end or ends of the compartment 305b or compartments 405b, 405c as soon as the receptacle 305 or 405 is properly introduced into the respective conduit.

Referring to FIG. 9, there is shown a portion of an elongated conduit 501 which confines and guides a series or row or file of equidistant receptacles including those denoted by the reference characters 505, 505a and 505b. One end wall of each receptacle carries a male distancing element 18 and the other end wall of each receptacle carries a female distancing element 17. The spherical head of the male distancing element 18 fits into and is turnable in the concave socket of the adjacent female distancing element 17 so that such distancing elements together form a coupling or joint 19 which can be said to constitute a universal joint. The major portion of each receptacle which is shown in FIG. 9 can resemble the major portion of any one of the previously described receptacles, e.g., the major portion of a receptacle 305 or 405. When a coupling 19 is properly assembled, the respective distancing elements 17, 18 automatically maintain the main or median portions of the respective receptacles (e.g., the receptacles 505, 505a or 505a, 505b) at an optimum distance from each other.

When properly coupled to each other, the receptacles 505, 505a, 505b (as well as any additional receptacles) constitute the links of a chain-like series of interconnected receptacles which can advance in a straight channel as well as in an arcuate channel. The arrangement is or can be such that the distancing elements 17, 18 of a coupling 19 can be separated from each other only outside of the conduit 501. For example, a preceding receptacle (such as 505) can be partially inserted into the conduit 501 so that its male distancing element 18 is still located externally of the inlet of the conduit, and the female distancing element 17 of the next-following receptacle 505a is coupled to the distancing element 18 of the receptacle 505 before the receptacle 505a is partially introduced into the conduit preparatory to attachment of its male distancing element 18 to the female distancing element 17 of the receptacle 505b, and so forth.

An advantage of the couplings 19 is that they can prevent a reduction of the mutual spacing of two neighboring receptacles below a minimum acceptable value as well as that they ensure retention of coupled-together receptacles at an optimum distance from each other, i.e., the distance between two receptacles which are coupled to each other cannot be increased beyond the combined effective length of two cooperating distancing elements 17, 18 as long as the receptacles which are coupled to each other are confined in the conduit 501.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for transporting sealed containers, comprising at least one elongated hydraulic conduit; and a plurality of container-confining liquid-permeable receptacles each receivable in and movable within said at least one conduit in at least one orientation, each of said receptacles having at least one external distancing element arranged to abut a neighboring receptacle in the at least one conduit.

2. The apparatus of claim 1, wherein at least one of said receptacles consists of two identical separable sections.

3. The apparatus of claim 1, wherein at least one of said receptacles comprises two separable sections having bevelled overlapping portions.

4. The apparatus of claim 1, wherein each of said receptacles has a front end and a rear end and a distancing element at each of said ends.

5. The apparatus of claim 1, wherein each of said receptacles has a central axis extending in the longitudinal direction of said at least one conduit when the respective receptacle is introduced into said at least one conduit, said distancing elements having axes which are at least closely adjacent the respective central axes.

6. The apparatus of claim 1, wherein each of said distancing elements includes a substantially spherical portion which is movable into abutment with a neighboring receptacle in said at least one conduit.

7. The apparatus of claim 1, wherein each of said receptacles has at least one opening for admission of containers into and for evacuation of containers from the respective receptacle, said at least one conduit having an internal surface and said at least one opening of each receptacle in said at least one conduit facing said internal surface.

8. The apparatus of claim 7, wherein said at least one conduit defines for said receptacles a path having a predetermined cross-sectional outline and each receptacle is receivable in and movable along said path with lateral play relative to said at least one conduit.

9. The apparatus of claim 1, wherein said at least one conduit has an internal surface and each of said receptacles has at least one external follower adjacent said internal surface when the respective receptacle is inserted into said at least one conduit.

10. The apparatus of claim 9, wherein said at least one conduit has at least one substantially longitudinally extending groove for the at least one follower of each of said receptacles.

11. The apparatus of claim 1, wherein each of said receptacles includes at least one signal generating device.

12. The apparatus of claim 11, wherein said at least one signal generating device includes a magnet.

13. The apparatus of claim 1, wherein said receptacles include a first and a second receptacle, said first receptacle having a male distancing element and said second receptacle having a female distancing element which is movably coupled with said male distancing element.

14. The apparatus of claim 13, wherein said male and female distancing elements form a universal joint.

15. Apparatus for transporting sealed containers, comprising at least one elongated hydraulic conduit; and a plurality of container-confining liquid-permeable receptacles each receivable in and movable within said at least one conduit in at least one orientation, each of said receptacles having at least one external distancing element arranged to abut a neighboring receptacle in the at least one conduit, each of said receptacles further having at least one container-receiving compartment extending substantially transversely of the longitudinal direction of said at least one conduit when the respective receptacle is received in said at least one conduit, said at least one conduit having an internal surface and said at least one compartment of a receptacle in said at least one conduit having at least one open end which faces said internal surface.

16. The apparatus of claim 15, wherein said at least one compartment of each of said receptacles is a straight tunnel and said receptacles are receivable in said at least one conduit with lateral play.

17. Apparatus for transporting sealed containers, comprising at least one elongated hydraulic conduit; and a plurality of container-confining liquid-permeable receptacles each receivable in and movable within said at least one conduit in at least one orientation, each of said receptacles having at least one external distancing element arranged to abut a neighboring receptacle in the at least one conduit, each of said receptacles further having a plurality of sections which are separable from each other to afford access to a container therein only when the respective receptacle is located outside of said at least one conduit, separation of said sections of said at least one receptacle involving a movement through a predetermined distance and said at least one receptacle being receivable in said at least one conduit with lateral play which is a lesser distance than said predetermined distance.

18. The apparatus of claim 17, wherein at least one of said receptacles consists of two separable sections.

19. Apparatus for transporting sealed containers, comprising at least one elongated hydraulic conduit; and a plurality of container-confining liquid-permeable receptacles each receivable in an movable within said at least one conduit in at least one orientation, each of said receptacles having at least one external distancing element arranged to abut a neighboring receptacle in the at least one conduit, each of said receptacles having a predetermined length and said distancing elements being arranged to maintaining the neighboring receptacles in said at least one conduit at a distance which is between approximately 20 and 25 percent of said predetermined length.

* * * * *